(12) United States Patent
Parviainen (10) Patent No.: US 10,122,925 B2
(45) Date of Patent: Nov. 6, 2018

(54) METHOD, APPARATUS, AND COMPUTER PROGRAM PRODUCT FOR CAPTURING IMAGE DATA

(71) Applicant: NOKIA TECHNOLOGIES OY, Espoo (FI)

(72) Inventor: Vesa Heikki Parviainen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 287 days.

(21) Appl. No.: 14/795,967

(22) Filed: Jul. 10, 2015

(65) Prior Publication Data

US 2015/0319366 A1    Nov. 5, 2015

Related U.S. Application Data

(63) Continuation of application No. 12/806,672, filed on Aug. 17, 2010, now Pat. No. 9,118,832.

(51) Int. Cl.
| | | |
|---|---|---|
| *H04N 5/232* | (2006.01) | |
| *H04N 7/18* | (2006.01) | |
| *G06K 9/00* | (2006.01) | |
| *G06F 3/041* | (2006.01) | |
| *H04N 5/374* | (2011.01) | |
| *H04N 5/372* | (2011.01) | |
| *G06F 3/03* | (2006.01) | |

(52) U.S. Cl.
CPC ....... *H04N 5/23293* (2013.01); *G06F 3/0304* (2013.01); *G06F 3/041* (2013.01); *G06K 9/00671* (2013.01); *H04N 5/23219* (2013.01); *H04N 5/372* (2013.01); *H04N 5/374* (2013.01); *H04N 7/185* (2013.01)

(58) Field of Classification Search
CPC .... H04N 5/23293; H04N 7/185; H04N 5/374; H04N 5/372; G06K 9/00671; G06F 3/041
See application file for complete search history.

(56) References Cited

U.S. PATENT DOCUMENTS

| | | |
|---|---|---|
| 6,222,583 B1 | 4/2001 | Matsumura et al. |
| 7,684,592 B2 | 3/2010 | Paul et al. |
| 7,775,437 B2 | 8/2010 | Cohen |

(Continued)

FOREIGN PATENT DOCUMENTS

| | | |
|---|---|---|
| EP | 1 791 348 A1 | 5/2007 |
| EP | 1 793 580 A1 | 6/2007 |

(Continued)

OTHER PUBLICATIONS

International Search Report for International Application No. PCT/IB2011/053370, dated Jan. 18, 2012.

(Continued)

*Primary Examiner* — Twyler Haskins
*Assistant Examiner* — Fayez Bhuiyan
(74) *Attorney, Agent, or Firm* — Alston & Bird LLP (57) ABSTRACT

A method comprises causing a user interface to provide an output directly or indirectly specifying at least one object, analyzing substantially real-time data from a camera to determine if the at least one object is located in the field of view of the camera, and, in response to determining that the at least one object is located in the field of view of the camera, causing an indication that the object has been located to be provided through the user interface.

20 Claims, 5 Drawing Sheets

(56) References Cited

U.S. PATENT DOCUMENTS

| | | |
|---|---|---|
| 7,860,309 B1 | 12/2010 | Bodnar et al. |
| 7,876,978 B2 | 1/2011 | Berger et al. |
| 8,024,359 B2 | 9/2011 | Rathus et al. |
| 8,081,230 B2 | 12/2011 | Jiang et al. |
| 8,233,789 B2 | 7/2012 | Brunner |
| 8,290,357 B2 | 10/2012 | Dey et al. |
| 8,345,101 B2 | 1/2013 | Bobbitt et al. |
| 8,488,839 B2 | 7/2013 | Sharon et al. |
| 8,493,494 B2 | 7/2013 | Zhou et al. |
| 8,497,902 B2 | 7/2013 | Osman |
| 8,762,041 B2 | 6/2014 | Lindner |
| 8,773,465 B2 | 7/2014 | France et al. |
| 8,903,430 B2 | 12/2014 | Sands et al. |
| 8,943,420 B2 | 1/2015 | Goldthwaite et al. |
| 2006/0038833 A1 | 2/2006 | Mallinson et al. |
| 2006/0046847 A1 | 3/2006 | Hashimoto |
| 2007/0024527 A1 | 2/2007 | Heikkinen et al. |
| 2007/0162942 A1 | 7/2007 | Hamynen et al. |
| 2008/0071749 A1 | 3/2008 | Schloter |
| 2008/0244465 A1 | 10/2008 | Kongqiao et al. |
| 2009/0215536 A1 | 8/2009 | Yee et al. |
| 2009/0247219 A1 | 10/2009 | Lin et al. |
| 2010/0002122 A1 | 1/2010 | Larson et al. |
| 2010/0013977 A1 | 1/2010 | Suzuki |
| 2010/0053363 A1* | 3/2010 | Kim .................. G06K 9/00255 348/222.1 |
| 2010/0157049 A1 | 6/2010 | Dvir et al. |
| 2010/0245287 A1 | 9/2010 | Thorn |
| 2011/0121068 A1 | 5/2011 | Emanuel et al. |
| 2011/0199479 A1 | 8/2011 | Waldman |
| 2011/0311144 A1 | 12/2011 | Tardif |
| 2011/0313779 A1 | 12/2011 | Herzog et al. |
| 2012/0019645 A1* | 1/2012 | Maltz ..................... G02B 7/287 348/78 |
| 2012/0062732 A1 | 3/2012 | Marman et al. |

FOREIGN PATENT DOCUMENTS

| | | |
|---|---|---|
| JP | 2009-301215 A | 12/2009 |
| WO | WO 01/026759 A1 | 4/2001 |
| WO | WO 2005/091125 A2 | 9/2005 |
| WO | WO 2007/000491 A1 | 1/2007 |
| WO | WO 2009/018161 A1 | 2/2009 |
| WO | WO 2009/023786 A1 | 2/2009 |

OTHER PUBLICATIONS

Written Opinion for International Application No. PCT/IB2011/053370 dated Jan. 18, 2012.

Supplementary European Search Report form European Patent Application No. 11 81 7843.3 dated Feb. 25, 2014.

Office Action for European Application No. 11 817 843.3 dated Feb. 24, 2015.

Tat-Jun Chin, et al; "Snap2Play: A Mixed-Reality Game Based on Scene Identification"; Advances in Multimedia Modeling Lecture Notes in Computer Science, 2008, vol. 4903/2008, pp. 220-229.

Di Zhong, et al; Real-Time View Recognition and Event Detection for Sports Video; Journal of Visual Communication and Image Representation; vol. 15, Issue 3, Sep. 2004, pp. 330-347.

Mika Hakkarainen, et al; "SymBall—Camera Driven Table Tennis for Mobile Phones"; VTT Information Technology, Finland; copyright 2005; whole document.

Tolga Capin, et al; "Camera-Based Virtual Environment Interaction on Mobile Devices"; Computer and Information Sciences—ISCIS 2006, vol. 4263, 2006; pp. 765-773; whole document.

David G. Lowe, "Object Recognition from Local Scale-Invariant Features," iccv, vol. 2, pp. 1150, Seventh International Conference on Computer Vision (ICCV'99)—vol. 2, 1999.

Paul Viola, et al; "Rapid Object Detection using a Boosted Cascade of Simple Features"; Computer Vision and Pattern Recognition, 2001. CVPR 2001—Proceedings of the 2001 IEEE Computer Society; 2001; pp. I-511-I-518.

Vincent Lepetit, Pascal Lagger, Pascal Fua, "Randomized Trees for Real-Time Keypoint Recognition," cvpr, vol. 2, pp. 775-781, 2005 IEEE Computer Society Conference on Computer Vision and Pattern Recognition (CVPR'05)—vol. 2, 2005.

Herbert Bay, et al; "Speeded-Up Robust Features (SURF)"; Computer Vision and Image Understanding vol. 110, Issue 3, Jun. 2008, pp. 346-359; Similarity Matching in Computer Vision and Multimedia.

GeoChaser App Review; Mobile Augmented Reality; [Online]; Feb. 25, 2010; [Retrieved on Jan. 10, 2012]; Retrieved from the Internet: <URL:http://www.mobileaugmentedreality.info/geochaser/>; the whole document.

Office Action for U.S. Appl. No. 12/806,672 dated Apr. 12, 2012.
Office Action for U.S. Appl. No. 12/806,672 dated Dec. 14, 2012.
Office Action for U.S. Appl. No. 12/806,672 dated Aug. 22, 2013.
Office Action for U.S. Appl. No. 12/806,672 dated Mar. 13, 2014.
Notice of Allowance for U.S. Appl. No. 12/806,672 dated Jan. 5, 2015.
Notice of Allowance for U.S. Appl. No. 12/806,672 dated Feb. 26, 2015.
Notice of Allowance for U.S. Appl. No. 12/806,672 dated Apr. 10, 2015.
Notice of Allowance for U.S. Appl. No. 12/806,672 dated May 26, 2015.

Castle, R. O. et al., *Object Recognition and Localization While Tracking and Mapping*, University of Oxford (Aug. 14, 2009), 2 pages.

Object Tracking Using Visual Filters, Pi Robot [online] [retrieved Oct. 26, 2015]. Retrieved from the Internet: URL: <http://www.pirobot.org/blog/0008/>. (copyright 2006-2015) 5 pages.

* cited by examiner

METHOD, APPARATUS, AND COMPUTER PROGRAM PRODUCT FOR CAPTURING IMAGE DATA

CROSS REFERENCE TO RELATED APPLICATION

This application is a continuation of and claims priority to U.S. application Ser. No. 12/806,672 filed Aug. 17, 2010, the entire contents of which are hereby incorporated by reference.

FIELD

The invention relates to an input method.

BACKGROUND

Devices such as mobile devices are generally provided with input means such as physical keys or touch screens in order to allow a user to control operations of the device, for example to play games using the device.

SUMMARY

According to a first aspect of the present invention, there is provided a method comprising causing a user interface to provide an output directly or indirectly specifying at least one object, analyzing substantially real-time data from a camera to determine if the at least one object is located in the field of view of the camera, and, in response to determining that the at least one object is located in the field of view of the camera, causing an indication that the object has been located to be provided through the user interface.

The method may further comprise causing display of the substantially real-time data from the camera.

The method may further comprise, in response to determining that the at least one object is located in the field of view of the camera, causing display of graphical information highlighting the at least one object. The graphical information may comprise the outline of a shape such as a rectangle enclosing a major part of the at least one object.

The method may further comprise measuring an interval between providing the output directly or indirectly specifying at least one object and determining that the at least one object is located in the field of view of the camera, and providing a value calculated based on the measured interval.

The method may further comprise providing an output directly or indirectly specifying plural objects, analyzing the substantially real-time data from the camera to determine if one of the plural objects is located in the field of view of the camera, and, in response to determining that one of the plural objects is located in the field of view of the camera, causing an indication of which of the plural objects has been located to be provided through the user interface. The method may further comprise determining subsequent operations of a process based on which of the plural objects has been located. The method may further comprise providing a value calculated based on which of the plural objects has been located.

The method may form part of a game.

According to a second aspect of the present invention, there is provided apparatus, comprising at least one processor, and at least one memory including computer program code, the at least one memory and the computer program code configured to, with the at least one processor, cause the apparatus at least to perform causing a user interface to provide an output directly or indirectly specifying at least one object, analyzing substantially real-time data from a camera to determine if the at least one object is located in the field of view of the camera, and, in response to determining that the at least one object is located in the field of view of the camera, causing an indication that the object has been located to be provided through the user interface.

The at least one memory and the computer program code may be configured to, with the at least one processor, cause the apparatus to perform causing display of the substantially real-time data from the camera.

The at least one memory and the computer program code may be configured to, with the at least one processor, cause the apparatus to perform, in response to determining that the at least one object is located in the field of view of the camera, causing display of graphical information highlighting the at least one object. The graphical information may comprise the outline of a shape such as a rectangle enclosing a major part of the at least one object.

The at least one memory and the computer program code may be configured to, with the at least one processor, cause the apparatus to perform measuring an interval between providing the output directly or indirectly specifying at least one object and determining that the at least one object is located in the field of view of the camera, and providing a value calculated based on the measured interval.

The at least one memory and the computer program code may be configured to, with the at least one processor, cause the apparatus to perform providing an output directly or indirectly specifying plural objects, analyzing the substantially real-time data from the camera to determine if one of the plural objects is located in the field of view of the camera, and, in response to determining that one of the plural objects is located in the field of view of the camera, causing an indication of which of the plural objects has been located to be provided through the user interface. The at least one memory and the computer program code may be configured to, with the at least one processor, cause the apparatus to perform determining subsequent operations of a process based on which of the plural objects has been located. The at least one memory and the computer program code may be configured to, with the at least one processor, cause the apparatus to perform providing a value calculated based on which of the plural objects has been located.

The at least one memory and the computer program code may be configured to, with the at least one processor, cause the apparatus to perform a method which form part of a game.

The apparatus may be a device further comprising user interface circuitry and user interface software configured to facilitate user control of at least some functions of the device though use of a display and configured to respond to user inputs, and a display and display circuitry configured to display at least a portion of a user interface of the device, the display and display circuitry configured to facilitate user control of at least some functions of the device.

According to a third aspect of the present invention, there is provided apparatus, comprising means for causing a user interface to provide an output directly or indirectly specifying at least one object, means for analyzing substantially real-time data from a camera to determine if the at least one object is located in the field of view of the camera, and means for, in response to determining that the at least one object is located in the field of view of the camera, causing an indication that the object has been located to be provided through the user interface.

According to a fourth aspect of the present invention, there is provided a non-transitory computer readable medium having stored thereon instructions for causing computing apparatus to perform a method comprising causing a user interface to provide an output directly or indirectly specifying at least one object, analyzing substantially real-time data from a camera to determine if the at least one object is located in the field of view of the camera, and, in response to determining that the at least one object is located in the field of view of the camera, causing an indication that the object has been located to be provided through the user interface.

According to a fifth aspect of the present invention, there is provided a computer program, optionally stored on a medium, comprising instructions for causing computer apparatus to perform the method according to the first aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
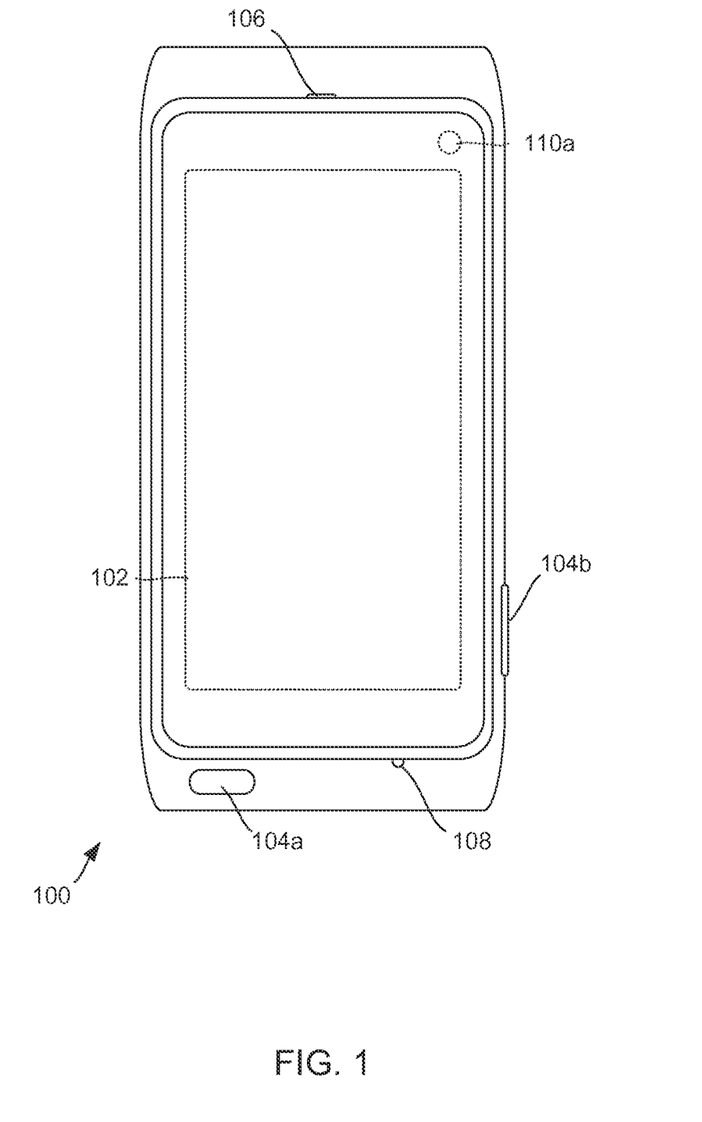
FIG. 1 shows a device in which example embodiments of the invention are implemented.

Referring to FIG. 1, a device 100 is shown. The device 100 embodies aspects of the invention and is not limiting on the scope of the invention. The device 100 has a touch sensitive display, or touchscreen, 102 for displaying content and for receiving tactile user inputs. The device 100 also has hardware keys, including a home key 104a and an image capture key 104b, as well as a speaker 106 and a microphone 108. The device 100 has two cameras, a first camera 110 and a second camera which is located on the opposite side of the device 100 to the touchscreen 102 and is not shown in FIG. 1. The device 100 may be a mobile computer, mobile phone, PDA, internet tablet, smartphone or other device.

Figure 2:
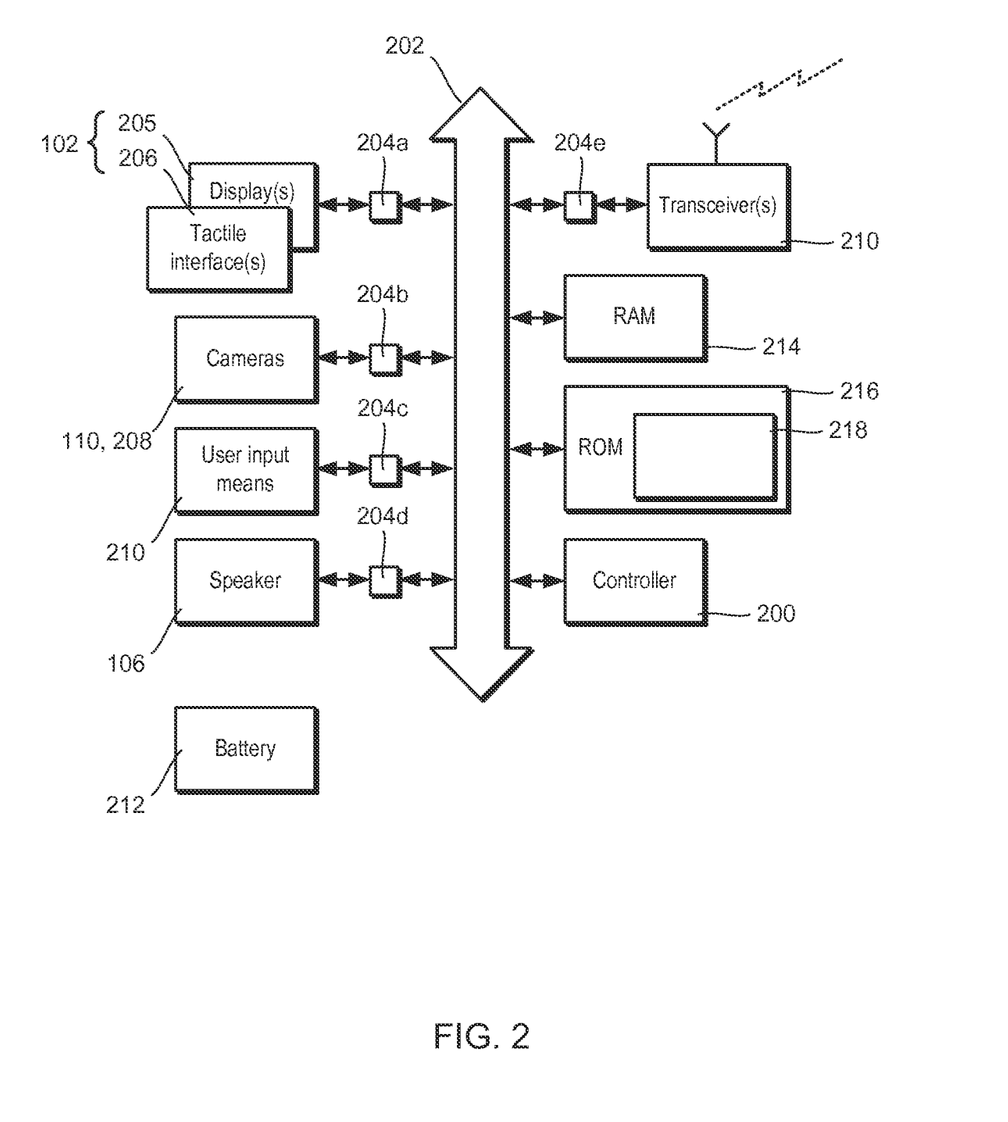
FIG. 2 illustrates some aspects of the hardware configuration of the device shown in FIG. 1; p

Referring mainly to FIG. 2, some aspects of the hardware configuration of the device 100 will now be described. The device 100 includes a controller 200 comprising one or more processors (not shown). The controller 200 communicates with the other hardware components via a system bus 202. Each other hardware component is connected to the system bus 202 either directly or via an interface (generally denoted by the numeral 204).

The touch sensitive display 102 comprises a display part 205 and a tactile interface part 206. The controller 200 receives inputs from the tactile interface 206 and controls the display shown on the display part 205. The touch sensitive display is connected to the system bus 202 via an interface 204a. The first camera 110 and the second camera 208 are also connected to the system bus 202 via an interface 204b. Each camera 110, 208 may comprise any image sensing technology such as a charge-coupled device (CCD) or an active pixel sensor such as a complementary metal oxide semiconductor (CMOS) device. User input means 210 are connected to the system bus 202 via an interface 204c. The user input means 210 include the keys 104a, 104b and the microphone 108, as well as any other input means such as a QWERTY or numeric keypad or an accelerometer. The speaker 106 is also connected to the system bus 202 via an interface 204d. The device 100 also includes a transceiver 210 connected to the system bus 202 via an interface 204e for communicating over a wireless link, such as a GSM, CDMA, UMTS, LTE, WiMax or Wi-Fi link. The device 100 also has a rechargeable battery 212 for storing electrical energy. Other hardware components (not shown) may also be included, such as a global positioning or system (GPS) or other positioning receiver and a vibrating element.

The device 100 includes both volatile memory 214 and non-volatile (or non-transitory) memory 216. Both types of memory are accessed by the controller 200 via the system bus 202 and both types are connected directly to the system bus 202. The volatile memory 214 is RAM, DRAM or any other type of volatile memory. The volatile memory 214 is used by the controller 200 for the temporary storage of data, for instance when controlling the operation of another hardware or software component or moving data between components. The non-volatile memory 216 is ROM, flash memory, a hard disk or any other type of non-volatile memory. The non-volatile memory 216 stores computer readable instructions 218 used in operating the device 100 as well as storing content and personal data (not shown).

Figure 3:
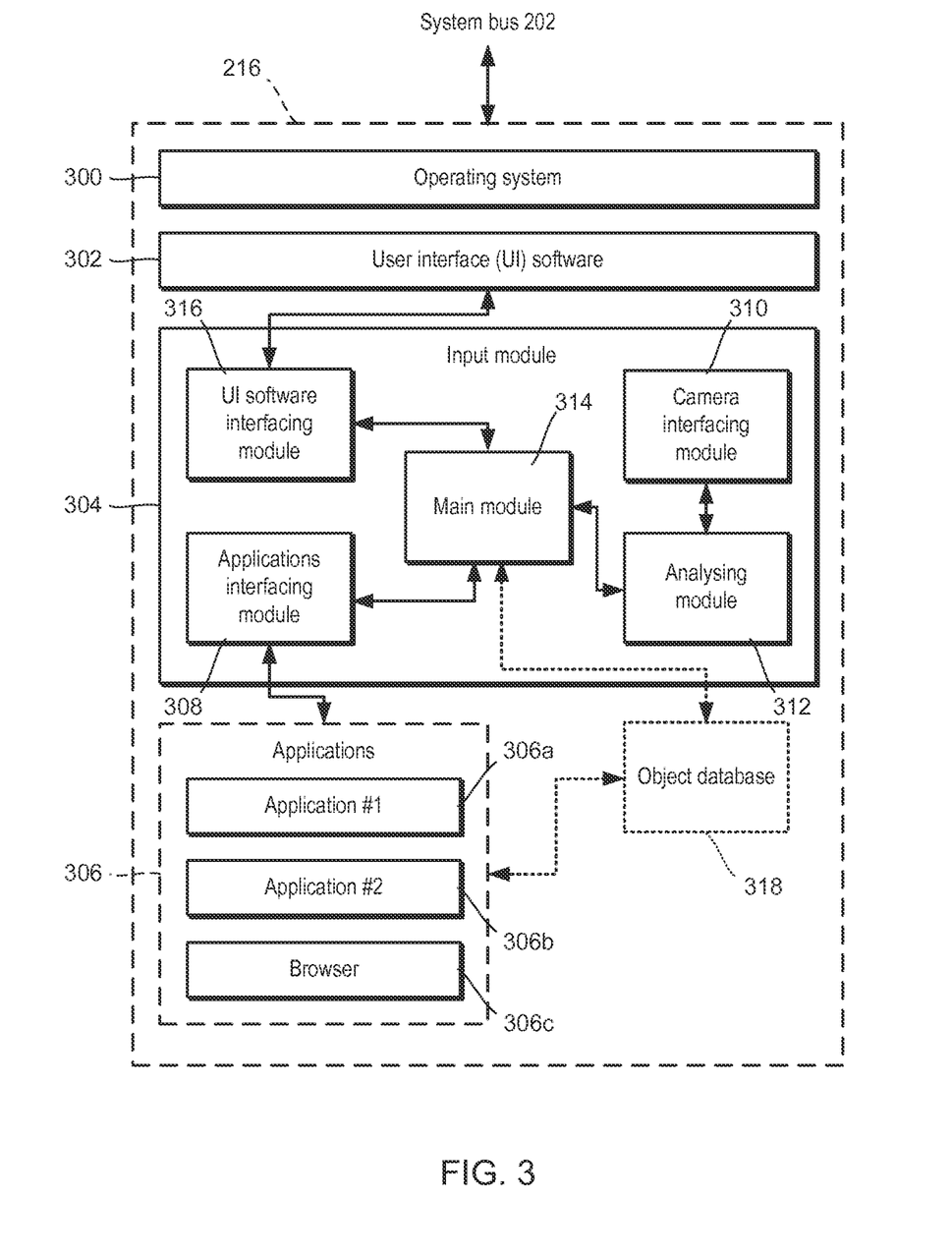
FIG. 3 illustrates some aspects of the software configuration of the device shown in FIG. 1.

Referring mainly to FIG. 3, some aspects of the software configuration of the device 100 will now be described. The non-volatile memory 216 stores an operating system 300, user interface software 302, an input module 304 and various software applications (generally denoted by the numeral 306).

The operating system 300 includes, amongst other things, a number of software modules that control operation of the device 100. The applications 306 and the input software 304 run on the operating system 300. The user interface software 302 operates along with user interface hardware, including the touchscreen 102, the keys 104a, 104b, the speaker 106 and the microphone 108, thus forming a user interface. The user interface software 302 may be separate from the operating system 300, in which case it interacts closely with the operating system 300, or may be integrated with the operating system 300.

As will be described in more detail below, the application 306 and the input module 304 are configured, when executed by the controller 200 using the memory 214, 216, to cause the device 100 at least to cause the user interface to provide an output directly or indirectly specifying at least one object, analyze substantially real-time data from the camera 110, 208 to determine if the at least one object is located in the field of view of the camera; and in response to determining that the at least one object is located in the field of view of the camera 110, 207, cause an indication that the object has been located to be provided through the user interface.

The input module 304 includes an applications interfacing module 308 for receiving messages from the applications 306, such as the request to locate the specified object(s) in the field of view of the camera 110, 208. The applications interfacing module 308 is also for sending messages to the applications 306, such as the indication that the specified object(s) has been located. The input module 304 also includes a camera interfacing module 310 for receiving the image data from the camera 110, 208 and, amongst other things, passing this image data to an analyzing module 312 also included in the input module 304. The analyzing module 312 is for analyzing the image data and employing object recognition methods to recognize the specified object(s). A main module 314 is included in the input module 304 for directing some of the operations of the other component modules, e.g., for determining that the request to locate a specified object has been received and for directing the analyzing module 312 to determine if the specified object(s) is located in the field of view of the camera 110, 208. The main module 314 is also connected to the user interface (UI) software 302 via a UI software interfacing module 316 for receiving user inputs or providing outputs, such as displaying image data from the camera 110, 208 and other graphical information on the touchscreen 102. In some example embodiments, the main module 314 is also able to connect to an object database 318 for receiving object data to be used for object recognition. In some example embodiments, some of the modules described above as being included in the input module 304 may be included in other software components (not shown) instead or may be shared with other software components.

Three software applications 306, namely a first application 306a, a second application 306b and an internet browser application ('browser') 306c, are shown as being stored in the non-volatile memory 216 in FIG. 3. However, it will be appreciated that there may be fewer or there may be more applications 306. The first and second applications 306a, 306b may be any type of application. For example, they may be games, educational applications, tools, etc. The browser 306c is for allowing a user to browse web pages retrieved, for example, via the Internet by means of the transceiver 210. In some example embodiments, there may be no browser or there may be more than one browser. The applications 306 can be installed in the non-volatile memory 216 before the device 100 is supplied to an end user or, for example, can be downloaded via the Internet and installed by the end user.

Applications 306 of various different types can make use of the input module 304 in various different ways. For example, the application 306 may be a game in which, as a part of the game, the user is challenged to locate a particular object or particular objects as quickly as possible and is given a score which depends partly or fully upon the time taken to locate the object(s). The user may also be challenged to find one of a set of different objects and be given a score which depends partly or fully upon which particular one of the set of objects has been located. Applications 306 of various different types can use the input module 304 to enable a user to choose between one of a plurality of different options by locating a particular object associated with a particular option. In other words, subsequent operations of the application 306 are determined based upon the object which the user locates in the field of view of the camera 110, 208. Of course, these different options need not necessarily be explicitly made known to a user.

The input module 304 can also be used to determine the position of a user relatively precisely. For example, the user can be requested to locate a specified object such as a building or landmark and, based on details about the located object (e.g., aspect, size, inclination), can determine the position of the user in relation to the object. Such information can be used in combination with GPS or other positioning information, or user-input information. Based on the user's position, the application 306 can direct the user to take various actions including, for example, moving closer to the object or turning to face another direction.

Request can be made to locate practically any type of object. Exemplary objects include everyday items, buildings and structures, people, animals, and plants, as well as pictures, symbols or words including those included in artwork, books or other media. The objects to be located may also vary depending upon the history of operation of the application 306, previous inputs by the user or by another person or application in communication with the device 100, previous objects located by the user, the time and date, the geographical location of the phone, and so forth.

Figure 4:
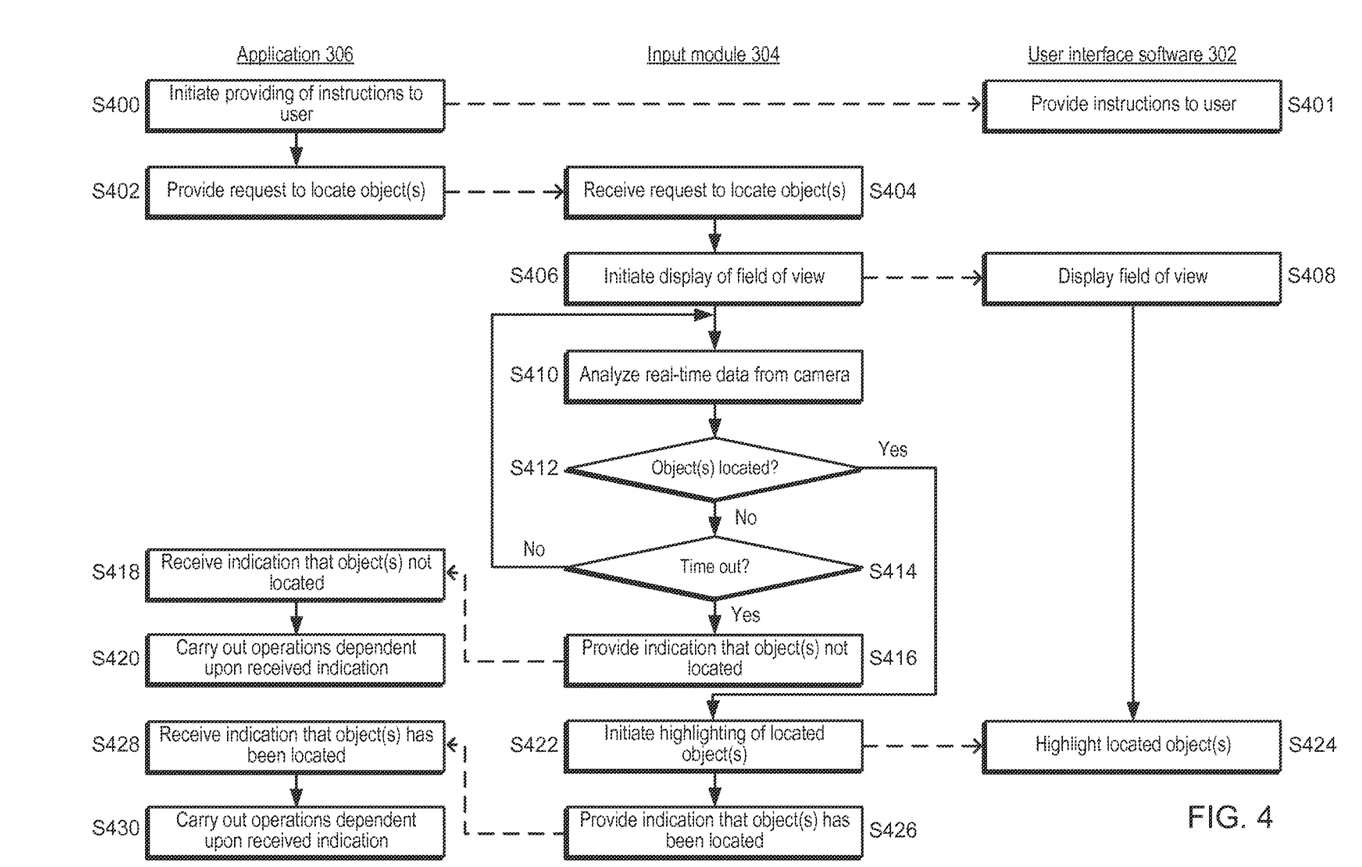
FIG. 4 is a flow diagram illustrating operation of the device shown in FIG. 1.
Figure 5:
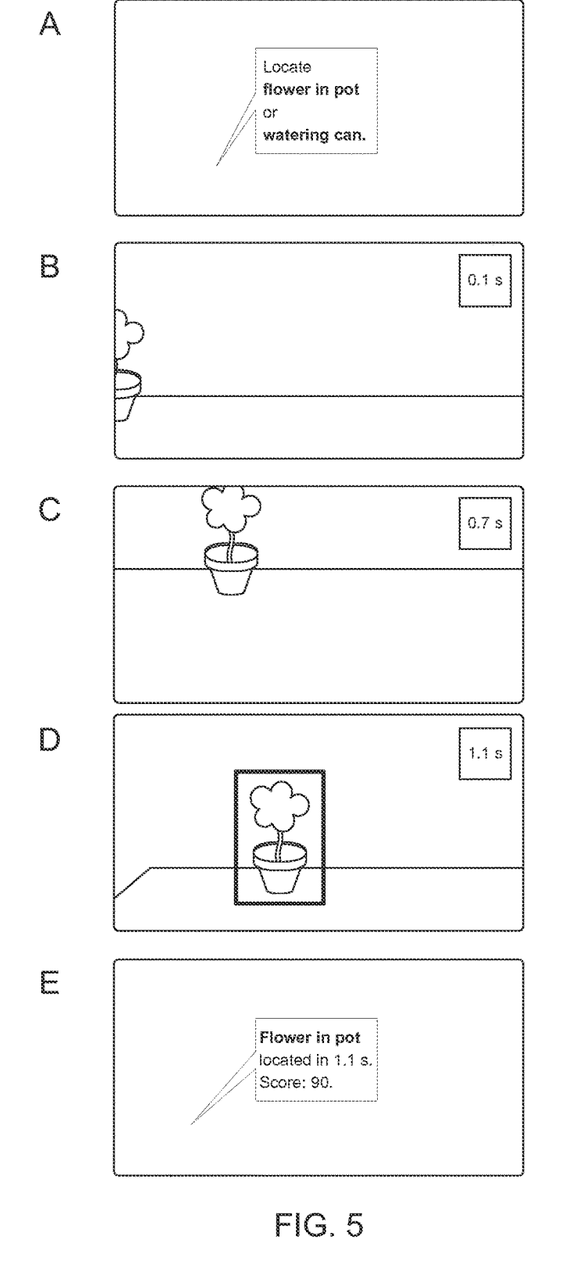
FIG. 5 shows exemplary screenshots displayed during operation of the device shown in FIG. 1.

Referring mainly to FIGS. 4 and 5, an input method according to an example embodiment will now be described. It will be appreciated that, in these operations, the controller 200 causes the device 100 to perform the stated functions and actions under control of instructions that form part of the user interface module 302, the input module 304 and/or the applications 306 running on the operating system 300 of the device 100. During execution, some or all of the computer programs may be stored in the volatile memory 214. In the event that only some of this computer program is stored in the volatile memory 214, the remainder resides in the non-volatile memory 216. When the application is the browser 306c, the device 100 operates in a similar way except that, in this case, scripting language or markup language associated with a web page will cause the browser 306c to make use of the input method.

Firstly, at steps S400 and S401, the running application 306 (e.g. a game application) provides instructions to the user via the user interface software 302 and, for example, the touchscreen 102 or the speaker 106. The instructions identify one or more objects and request that the user photographs one of the objects. The application 306 simultaneously or subsequently provides a request to locate a specified object to the input module 304 (see step S402). In some example embodiments, the request specifies a set of different objects and that any object in the set of different objects is to be located. In some example embodiments, all of the objects in a set of different objects are to be located in the field of view of the camera 110, 208. As shown in FIG. 5A, these instructions may describe the objects to be located. However, as mentioned above, the instructions to the user do not necessarily have to specify which object(s) are to be located (although the request sent to the input module 304 does); the instructions to the user may contain a clue (e.g. a cryptic clue) as to the identity of the object that is required to be located.

The request to locate the specified object(s) can include the data required by the input module 304 to determine whether or not a specified object has been located in the field of view of the camera 110, 208. Such data is referred to herein as object data. The object data may have been stored within the application 306 itself or may have been retrieved by the application 306 from the object database 318 or from another location such as an online location accessible via the Internet. Alternatively, the request to locate the specified object(s) includes, instead of the object data itself, data indicating a location from where the object data can be retrieved, e.g., from a location in the object database 318 or an online location. A name of the object or some other description of the object is associated with the object data so as to allow the object data to be retrieved if necessary. Amongst other things, this name or description can also allow the input module 304 to indicate which one(s) of a set of different objects has been located. The request to locate the object(s) may also include other optional data, such as data indicating the maximum time period for attempting to locate objects.

As used herein, the term object refers to a physical object or to a part of a physical object or to a plurality of physical objects. The term refers equally to a class of such objects, i.e., any object in a set of objects having one or more similar characteristics. Examples of a class of objects would be 'a flower' or 'a house'. It will be appreciated by persons skilled in the relevant art that the object data includes data characterizing certain features of a specified object. The object data can be used to recognize objects in the field of view of the camera 110, 208 under various circumstances. For example, objects may be viewed from different angles, from different distances (and so have different sizes), in different lighting conditions, and may also be partly obscured. It will also be appreciated that objects having a range of different characteristics, e.g., objects having different shapes, colors or textures or having fewer or more features, will nevertheless be considered as corresponding to the specified object. In some cases, the object data is such that an object can still be recognized even if only a part of the object is in the field of view of the camera 110, 208. In some example embodiments, the object data is determined, e.g. during development of the application 306, by way of an (offline) learning process involving analysis of a set of training images. In some example embodiments, the object data may include information relating to the three-dimensional structure of the object. The form of the object data depends upon the object recognition method used by the analyzing module 312, which is described in more detail below.

After providing the request to locate the specified object(s) to the input module 304, the application 306 may pause or may continue to carry out certain operations in the same time period in which the input module 304 is also carrying out operations. For example, the application 306 may continue to update the display of graphical information on a portion of the touchscreen 102 while a portion of the touchscreen 102 is also being used by the input module 304. Alternatively, the application 306 may continue to provide information to the user via the speaker 106.

At step S404, the input module 304 receives the request to locate the specified object(s) and, if necessary, retrieves the object data from an indicated location in the object database 318 or from an online location, as described above. If the input module 304 is unable to retrieve the object data, then a response is sent to the application 306 indicating that the object data cannot be retrieved.

Either the first camera 110 or the second camera 208 can be used in the input method. However, the second camera 208 is more likely to be used since it generally provides higher quality image data and due to its position in relation to the touchscreen 102. The request to locate the specified object(s) received from the application 306 may include data indicating which of the cameras 110, 208 is to be used. If this data is not provided, then the second camera 208 may be used by default. It will be assumed hereinafter that the second camera 208 is to be used.

After receiving the request to locate the specified object(s), the input module 304 activates the camera 208 if it is not already activated. In other words, the input module 304 directs the camera 208 to begin sensing image data. Then, the input module 304 (see step S406) together with the user interface module 302 (see step S408) cause the device 100 to display the image data from the camera 208 on the touchscreen 102 substantially in real time, thereby providing a camera viewfinder. It will be appreciated that the device 100 may also carry out other operations when the camera 208 is activated, such as, for example, autofocusing and automatically setting the sensitivity of the camera sensor. In some example embodiments, the user may also be able to control the camera 208, for example to allow the focus or the magnification to be changed. This can be provided for by components of the input module 304 or by other software components (not shown) and by the user interface software 302. Some of these operations are similar to those carried out when a camera or camcorder application (not shown) is running. The input module 304 also starts a timer for timing the attempt to located the specified object(s).

Example screenshots as the user moves the device 100 in an attempt to locate a specified object in the field of view of the camera 208 are shown in FIGS. 5B, 5C and 5D. Additional information may also be displayed on the touchscreen 102.

This additional information can include, for example, the time elapsed since the attempt to locate the object was started (as shown in FIGS. 5B, 5C and 5D), information about the object(s) to be located, one or more user input buttons, and so forth.

As well as being displayed on the touchscreen 102, the image data from the camera 208 is also provided to the analyzing module 312 where it is analyzed to determine whether or not a specified object is located in the field of view of the camera 208 (see step S410). In some example embodiments, the analysis does not begin until a user input is received, e.g., via the image capture key 104b or a button provided on the touchscreen 102. This allows the user to have greater control over the objects which are determined to be located. In some example embodiments, the user may be required to locate the object within a portion of the field of view of the camera 208, which can be indicated by means of an outline of a shape or other graphical information displayed on the touchscreen 102. In this case, only image data within this portion of the field of view may be analyzed.

The image data may be subject to additional processing prior to being analyzed. For example, the resolution, color depth and frame rate of the image data may be reduced.

The image data in each of a series of frames are analyzed using an object recognition method to recognize specified object(s) as described by the object data provided to the input module 304. Appropriate object recognition methods will be known per se to persons skilled in the relevant art. Relevant references include, inter alia:

1. D. Lowe, Object recognition from local scale-invariant features, Proceedings of the Seventh IEEE International Conference on Computer Vision, p. 1150 (1999).
2. P. Viola and M. Jones, Rapid object detection using a boosted cascade of simple features, Proceedings of the 2001 IEEE Computer Society Conference on Computer Vision and Pattern Recognition (CVPR 2001), p. 511 (2001).
3. V. Lepetit, P. Lagger, and P. Fua, Randomized trees for real-time keypoint recognition, Proceedings of the 2005 IEEE Computer Society Conference on Computer Vision and Pattern Recognition (CVPR 2005), p. 775 (2005).
4. H. Bay, A. Ess, T. Tuytelaars and L. Van Gool, SURF: Speeded Up Robust Features, Computer Vision and Image Understanding (CVIU), vol. 110, no. 3, p. 346 (2008).

Analysis of the image data continues until either it is determined that the specified object(s) is located (see step S412) or that a certain time period has elapsed since the attempt to locate the specified object(s) was started (see step S414). The certain time period may be indicated by the application 306 in the request to locate the specified object(s) or, if it is not indicated, a default value is used. The time period may be of any appropriate duration which, in some cases, will be a few seconds and, in some other cases, a few minutes.

If the specified objects are not located before the certain time period has elapsed, then an indication that the objects have not been located is provided to the application 306 (see step S416). In response to receiving this indication (see step S418), the application 306 resumes and carried out operations dependent upon the received indication (see step S420). For example, the application 306 may give the user another chance to locate the object(s), instruct the user to locate a different object(s), provide some assistance to the user, or instruct the user to provide an input via another means.

If at least one of the specified objects is located before the certain time period has elapsed, then, in some example embodiments, the located object(s) is highlighted by displaying graphical information on the touchscreen 102. This is initiated by the input module 304 (see step S422) and completed by the user interface software 302 (see step S424). For example, the object may be substantially enclosed by a shape such as a rectangle, as shown in FIG. 5D. Alternatively, the outline and/or interior of the object(s) may be highlighted or an image or a symbol may be displayed over the object or near to the object(s). An additional feedback signal, for example, a sound or vibration, may also be provided to the user when at least one of the specified objects is located.

In some example embodiments, the located object(s) is tracked, i.e., its movement within the field of view of the camera 208 is detected over a period of time. This can be performed by recognizing the specified object(s) in each of a series of frames. Thus, the graphical information highlighting the object may be caused to move along with the located object if the device 100 or the object moves. Moreover, in some example embodiments, a further timer can be started when the object(s) is first located and the length of time during which the user is able to keep the object(s) within the field of view can be measured. In other example embodiments, the touchscreen 102 displays a still image after the specified object(s) has been located.

In cases where the user can select any one of a set of different objects, the user can be provided with a means for ignoring the highlighted object, for example, by pressing the image capture key 104b or a button provided on the touchscreen 102 within a relatively short time period of the object being first highlighted. If the user chooses to ignore the highlighted object, then the process returns to the step of analyzing the image data (step S410). In cases where the user must select all of the objects in a set of different objects, if at least one of the specified objects has been located and highlighted but one or more other objects are still to be located, then the image data may continue to be analyzed to try to locate the one or more other objects.

In some example embodiments, the user can be provided with a means for stopping use of the input method and returning to the application 306, for example, by pressing the home key 104a or a button provided on the touchscreen 102

An indication that one or more of the specified object(s) has been located is then provided to the application 306 (see step S426). The indication may include data indicating, amongst other things, the identity of the one or more objects which have been located, the time taken to locate the object(s), or the length of time during which the object was kept in the field of view. The indication may also include further information about the located object(s) such as, for example, information relating to color, aspect, size, inclination, etc. This further information can be determined by the analyzing module 312 either during or after the object recognition.

In response to receiving the indication that the specified object(s) has been located (see step S428), the application 306 resumes and carries out operations dependent upon the received indication (see step S430).

For example, the application 306 can calculate a score based on the time taken to locate the object(s), which one of a set of different objects has been located or how many of a set of different objects have been located. More specifically, the score can be inversely proportional to the time taken or dependent upon the difficulty generally associated with locating certain objects or proportional to the number of objects located. The score can be displayed, together with other information, on the touchscreen 102 as shown, for example, in FIG. 5E. The score can also be combined with previous scores, used to determine subsequent operations, stored in memory 214, 216, and/or shared via the Internet.

Also, the application 306 can determine its subsequent operations based on which one of a set of different objects has been located. For example, the application 306 can carry out a certain set of operations in response to receiving an indication that a certain object has been selected and can carry out a another set of operations in response to receiving an indication that another object has been selected. In embodiments in which further details about the located objects are also included in the indication, then the application 306 can also determine which subsequent operations are to be carried out based on these further details. For example, the application 306 may use the further details to determine the position of the user in relation to the object and then direct the user to move accordingly. In some example embodiments, the application 306 may determine that another specified object is now to be located and the process described above can be repeated for this other specified object. This may be performed while the camera viewfinder is still being displayed, i.e., objects to be located may be generated 'on the fly' based on objects located by the user.

When the application is a browser 306c, some or all of the data included in the indication received from the input module 304 may be provided to a remote server which takes the appropriate action(s).

Thus, the herein described example embodiments can have the advantage of providing a way of allowing a user to control operations of the device 100, for example to play games using the device 100. The user can control operations by merely moving the device 100 (or objects) so as to locate one or more specified objects in the field of view of the camera 208 and so the user does not necessarily have to use input means such as the touchscreen 102 or hardware keys 104a, 104b. Thus, the control can be carried out more quickly and easily in some circumstances. The way of controlling operations can also be used by applications 306 to provide a richer user experience and to provide a way of testing the visuo-motor skills of the user. It also allows an application 306 to interact with the physical environment in a great variety of ways. For instance, the application 306 can implement a modern, technological implementation of a traditional treasure hunt game It should be realized that the foregoing example embodiments should not be construed as limiting. Other variations and modifications will be apparent to persons skilled in the art upon reading the present application.

For instance, the device 100 may not have a touch sensitive display 102, but instead may include a display and a numerical keypad and/or a QWERTY or equivalent keypad. The device 100 may also have only one camera or more than two cameras. Alternatively, the camera may be separate from the device 100.

Also, the input module 304 may be combined with the application 306. Here, functions said to be provided separately by the application 306 and the input module 304 are provided by the application 306. This may provide a smaller size of software needed to perform the required functions, although other applications may not be able to share the input module 304.

In some example embodiments, the user interface software 302 is integrated with the input module 304. Here, functions said to be provided separately by the user interface software 302 and the input module 304 are provided by the combined user interface and input software module 304.

In other example embodiments, the input module 304 may be combined with the user interface software 302 and the application 306. Here, functions said to be provided separately by the user interface software 302, the application 306 and the input module 304 are provided by the combined software.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A method comprising:
   causing a user interface to provide instructions to capture an image, wherein the instructions comprise at least one specified object to be captured in the image;
   receiving image data captured with a camera;
   analyzing the image data with a processor to determine if the at least one specified object is located in at least a portion of the image; and
   in response to determining that the at least one specified object is located in the at least the portion of the image, causing an indication that the at least one specified object has been located to be provided via the user interface.

2. The method of claim 1, wherein the at least one specified object comprises at least one of:
   a physical object;
   a part of a physical object; or
   a class of objects.

3. The method of claim 1, further comprising:
   causing display of graphical information indicating a position in which to capture the at least one specified object relative to a field of view of the camera.

4. The method of claim 3, wherein the graphical information comprises an outline of a shape.

5. The method of claim 1, wherein the method further comprises updating the field of view of the camera as the camera is moved.

6. The method of claim 1, further comprising:
   causing display of a field of view of the camera on a touch sensitive screen.

7. The method of claim 1, wherein the user interface is provided on a device and wherein analyzing the image data comprises recognizing at least one object using the image data and object data stored on the device.

8. The method of claim 1, wherein the user interface is provided on a device comprising a transceiver for wireless data communication, and wherein analyzing the image data comprises recognizing at least one object using the image data and object data received from at least one of a remote server or remote database.

9. The method of claim 1, wherein the user interface is provided on a device and the method further comprises:
   causing storage of object data by at least one application on a device, wherein analyzing the image data comprises analyzing the image data relative to the object data.

10. The method of claim 1, wherein the user interface is provided on a device and the method further comprises:
    causing transmission of a message indicating that the at least one specified object has been located to at least of an application on the device or a remote server.

11. The method of claim 1, wherein subsequent operations of an application are determined based on the at least one specified object located in the image data.

12. The method of claim 1, wherein the at least one specified object comprises at least one symbol.

13. The method of claim 1, further comprising:
    determining positioning information.

14. An apparatus comprising at least one processor and at least one memory including computer program code, the at least one memory and the computer program code configured to, with the processor, cause the apparatus to at least:
    cause a user interface to provide instructions to capture an image, wherein the instructions comprise at least one specified object to be captured in the image;
    receive image data captured with a camera;
    analyze the image data to determine if the at least one specified object is located in at least a portion of the image; and
    in response to determining that the at least one specified object is located in the at least the portion of the image, cause an indication that the at least one specified object has been located to be provided via the user interface.

15. The apparatus of claim 14, wherein the at least one specified object comprises at least one of:
    a physical object;
    a part of a physical object; or
    a class of objects.

16. The apparatus of claim 14, wherein the at least one memory and the computer program code are further configured to, with the processor, cause the apparatus to at least:
    cause display of graphical information indicating a position in which to capture the at least one specified object relative to a field of view of the camera.

17. The apparatus of claim 14, wherein the user interface is provided on a device and wherein analyzing the image data comprises recognizing at least one object using the image data and object data stored on the device.

18. The apparatus of claim 14, wherein the user interface is provided on a device and the at least one memory and the computer program code are further configured to, with the processor, cause the apparatus to at least:
    cause storage of object data by at least one application on a device, wherein analyzing the image data comprises analyzing the image data relative to the object data.

19. The apparatus of claim 14, wherein the user interface is provided on a device and the at least one memory and the computer program code are further configured to, with the processor, cause the apparatus to at least:
    cause transmission of a message indicating that the at least one specified object has been located to at least of an application on the device or a remote server.

20. A computer program product comprising at least one non-transitory computer-readable storage medium having computer-executable program code instructions stored therein, the computer-executable program code instructions comprising program code instructions to:

cause a user interface to provide instructions to capture an image, wherein the instructions comprise at least one specified object to be captured in the image;

receive image data captured with a camera;

analyze the image data to determine if the at least one specified object is located in at least a portion of the image; and     in response to determining that the at least one specified object is located in the at least the portion of the image, cause an indication that the at least one specified object has been located to be provided via the user interface.

\* \* \* \* \*